United States Patent
Bullock (10) Patent No.: US 10,530,902 B2
(45) Date of Patent: Jan. 7, 2020

(54) METHOD OF OPERATING A PROTOCOL TRANSLATOR

(71) Applicant: Gregory Bullock, Alexandria, VA (US)

(72) Inventor: Gregory Bullock, Alexandria, VA (US)

(*) Notice: Subject to any disclaimer, the term of this patent is extended or adjusted under 35 U.S.C. 154(b) by 120 days.

(21) Appl. No.: 15/828,295

(22) Filed: Nov. 30, 2017

(65) Prior Publication Data

US 2019/0166232 A1 May 30, 2019

(51) Int. Cl.
| | | |
|---|---|---|
| *G06F 15/16* | (2006.01) |
| *H04L 29/06* | (2006.01) |
| *H04L 12/741* | (2013.01) |
| *H04L 12/26* | (2006.01) |
| *H04L 12/861* | (2013.01) |
| *H04L 12/24* | (2006.01) |

(52) U.S. Cl.
CPC .......... *H04L 69/18* (2013.01); *H04L 41/0226* (2013.01); *H04L 43/106* (2013.01); *H04L 45/745* (2013.01); *H04L 49/9042* (2013.01); *H04L 69/22* (2013.01)

(58) Field of Classification Search
CPC ... H04L 1/1854; H04L 12/5601; H04L 29/06; H04L 29/08846; H04L 29/1216; H04L 47/10; H04L 47/125; H04L 49/552; H04L 63/0227; H04L 67/2823; H04L 41/0226; H04L 69/18; H04L 63/0272; H04L 1/1685; H04B 7/0452; H04B 7/15521; H04B 7/18593; H04W 40/06; G06F 13/387

See application file for complete search history.

(56) References Cited

U.S. PATENT DOCUMENTS

| | | | | |
|---|---|---|---|---|
| 5,778,189 A | * | 7/1998 | Kimura .................. | G06F 13/387 709/236 |
| 6,775,707 B1 | * | 8/2004 | Bennett .............. | H04B 7/18593 370/395.4 |
| 6,816,458 B1 | * | 11/2004 | Kroon ..................... | H04L 47/10 370/235 |
| 7,551,895 B1 | * | 6/2009 | VanLaningham ..... | H04W 40/06 370/243 |
| 7,912,069 B2 | * | 3/2011 | Kramer ............... | H04L 12/5601 370/395.52 |

(Continued)

OTHER PUBLICATIONS

Series X: Data Communication Networks: Open Systems Interconnection (OSI)—Protocol Specifications, Conformance Testing (2008).

*Primary Examiner* — Dustin Nguyen
(74) *Attorney, Agent, or Firm* — Maskell Law PLLC; Benjamin E. Maskell (57) ABSTRACT

Disclosed is method for operating a protocol translator between an upstream device and a downstream device including receiving, at the protocol translator from the upstream device, a first plurality of packets according to a first protocol, extracting a payload from each of the first plurality of packets according to the first protocol, constructing a message from the extracted payloads, slicing the message into a second plurality of packets according to a second protocol, storing the second plurality of packets in a retransmit queue, sending the second plurality of packets to the downstream device, receiving an acknowledgement from the downstream device, and removing from the retransmit queue, one or more packets identified by the acknowledgement.

15 Claims, 6 Drawing Sheets

(56) References Cited

U.S. PATENT DOCUMENTS

| | | | |
|---|---|---|---|
| 8,533,552 B2* | 9/2013 | Chang | H04L 1/1854 |
| | | | 714/748 |
| 9,246,819 B1* | 1/2016 | Thirasuttakorn | H04L 47/125 |
| 2004/0109473 A1* | 6/2004 | Lebizay | H04L 29/06 |
| | | | 370/466 |
| 2005/0055577 A1* | 3/2005 | Wesemann | H04L 63/0272 |
| | | | 726/4 |
| 2005/0210177 A1* | 9/2005 | Norden | G06F 13/387 |
| | | | 710/317 |
| 2006/0168247 A1* | 7/2006 | Hunneyball | H04L 29/1216 |
| | | | 709/228 |
| 2007/0124577 A1* | 5/2007 | Nielsen | H04L 63/0227 |
| | | | 713/151 |
| 2007/0286104 A1* | 12/2007 | Li | H04L 12/5601 |
| | | | 370/310.1 |
| 2008/0137585 A1* | 6/2008 | Loyola | H04B 7/15521 |
| | | | 370/315 |
| 2009/0279429 A1* | 11/2009 | Griffoul | H04L 29/08846 |
| | | | 370/230 |
| 2009/0303998 A1* | 12/2009 | Rao | H04L 1/1685 |
| | | | 370/392 |
| 2013/0315139 A1* | 11/2013 | Abraham | H04B 7/0452 |
| | | | 370/328 |
| 2014/0029493 A1* | 1/2014 | Vos | H04L 67/2823 |
| | | | 370/310 |
| 2019/0058675 A1* | 2/2019 | Schubert | H04L 49/552 |

\* cited by examiner

METHOD OF OPERATING A PROTOCOL TRANSLATOR

BACKGROUND OF THE INVENTION

Field of the Invention

The embodiments of the invention relate to methods of operating a protocol translator, and more particularly, to a method of operating a protocol translator for facilitating communications between devices that use different communications protocols. Although embodiments of the invention are suitable for a wide scope of applications, it is particularly suitable for integrating ancient equipment into modern control systems.

Discussion of the Related Art

Sophisticated and complex computer systems have existed at the forefront of modern technological marvels. From the days of computer punch cards and the Apollo space missions, the most advanced computers of the day were responsible for mission critical applications. Computer technology has progressed at an astounding pace bringing with it newer, faster, more complex, and smarter methods for almost every task.

An "ancient" computer or device can be a device that is over 10 years old or for a computer or device for which updated software and hardware replacements are not available. Ancient computer systems still exist that control ancient infrastructure like power plants, dams, and other large-scale public infrastructure. Other ancient computer systems control ancient devices that still have significant economic value. For example, large telescopes can be extremely expensive and, although ancient, have not been substantially displaced by improvements in telescope technology. In another example, certain "ancient" electronic test equipment, such as spectrum analyzers, signal generators, and network analyzers can be still be used for their intended purposes and have not been substantially displaced by newer technology.

There exists a need to replace ancient computer systems with modern computing systems that may control these ancient devices as well as other modern devices and perform other functions that would be expected of modern computing systems. However, obstacles exist to simply replacing such ancient computing systems because the operating systems and software that communicate with the corresponding ancient devices are lost, broken, no longer available, no longer updated, operates on unique hardware, or is written in a programming language that is no longer used.

Consider, for example, a hypothetical $100 million dollar telescope from the 1980's and a (then) state-of-the art computer control system. The computer control system communicates with embedded control software and hardware in the telescope according to a then state-of-the art protocol. In present day, however, the computer control system, the telescope interface software and hardware, and the communication protocol would all be considered ancient. Still, the telescope retains great economic value and functions perfectly as a telescope. Further consider a hardware failure in the computer control system renders the entire system inoperable. While the simplest of modern computers likely has the computing power to control the telescope, the ancient control software and hardware that interfaces with the telescope is not compatible with modern operating systems, the company that originally provided the software no longer has the source code, is out of business, or it was written in a language that is no longer used or for which there are no longer compilers for present-day computers. Any of the aforementioned problems can render an expensive and useful (yet old) telescope completely useless because replacement hardware and software does not exist to interface with the telescope.

In the foregoing hypothetical, current options for repairing the telescope would include replacing both the broken computer control system AND the functional telescope control system. Replacing the telescope control system could be a significant engineering undertaking as custom hardware and software would need to be designed to interface with the motors, servos, and image capture devices on the telescope. This effort is wasteful and costly in view of the fact that other than the computer control system, the telescope embedded hardware and software is functional.

Thus there is a need to use modern computer systems with ancient hardware without having to completely replace or reengineer the ancient hardware.

SUMMARY OF THE INVENTION

Accordingly, embodiments of the invention are directed to a method of operating a protocol translator that substantially obviates one or more of the problems due to limitations and disadvantages of the related art.

An object of embodiments of the invention is to provide a modern interface to an ancient device.

Another object of embodiments of the invention is to provide communication with ancient devices according to modern protocols.

Yet another object of embodiments of the invention is to provide low-cost options for modernizing ancient public infrastructure.

Still another object of embodiments of the invention is to provide an interface for ancient devices that still have modern applications.

Additional features and advantages of embodiments of the invention will be set forth in the description which follows, and in part will be apparent from the description, or may be learned by practice of embodiments of the invention. The objectives and other advantages of the embodiments of the invention will be realized and attained by the structure particularly pointed out in the written description and claims hereof as well as the appended drawings.

To achieve these and other advantages and in accordance with the purpose of embodiments of the invention, as embodied and broadly described, a method of operating a protocol translator includes a receiving, at the protocol translator from the upstream device, a first plurality of packets according to a first protocol, extracting a payload from each of the first plurality of packets according to the first protocol, constructing a message from the extracted payloads, slicing the message into a second plurality of packets according to a second protocol, storing the second plurality of packets in a retransmit queue, sending the second plurality of packets to the downstream device, receiving an acknowledgement from the downstream device, and removing from the retransmit queue, one or more packets identified by the acknowledgement.

In another aspect, a method of operating a protocol translator includes a receiving, at the protocol translator from the upstream device, a first packet according to a first protocol, extracting a first payload from the first packet according to the first protocol, caching the first payload until a final packet is received, constructing a message from at least the first payload and the second payload of the final packet, slicing the message into a second plurality of packets according to a second protocol, storing a second packet of the second plurality of packets in a downstream retransmit queue, and sending the second packet to the downstream device.

In yet another aspect, a method of operating a protocol translator includes receiving, at the protocol translator from the upstream device, a first plurality of packets according to a first protocol, extracting a payload from each of the first plurality of packets according to the first protocol, constructing a message from the extracted payloads, verifying the message conforms to the first protocol, slicing the message into a second plurality of packets according to a second protocol, storing the second plurality of packets in a retransmit queue, maintaining, for the downstream device, a connection datastore, the connection profile comprising an information whether the downstream device is ready to receive data and a maximum size of data that can be received.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the invention and are incorporated in and constitute a part of this specification, illustrate embodiments of the invention and together with the description serve to explain the principles of embodiments of the invention.

DETAILED DESCRIPTION OF THE PREFERRED EMBODIMENTS

Reference will now be made in detail to the preferred embodiments of the invention, examples of which are illustrated in the accompanying drawings. The invention may, however, be embodied in many different forms and should not be construed as being limited to the embodiments set forth herein; rather, these embodiments are provided so that this disclosure will be thorough and complete, and will fully convey the concept of the invention to those skilled in the art. In the drawings, the thicknesses of layers and regions are exaggerated for clarity. Like reference numerals in the drawings denote like elements.

Figure 1:
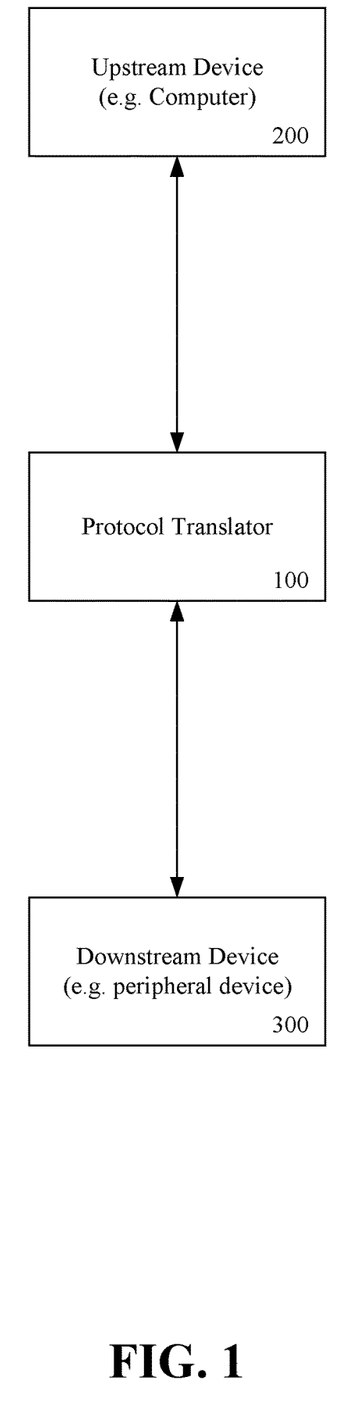
FIG. 1 is a system diagram incorporating a protocol translator according to an exemplary embodiment of the invention.

FIG. 1 is a system diagram incorporating a protocol translator according to an exemplary embodiment of the invention. As shown in FIG. 1, protocol translator 100 can communicate with an upstream device 200 and a downstream device 300. The upstream device 200 can be, for example, an ordinary, off the shelf computer. The upstream device 200 can be, for example, a server, super computer, or cloud computer. The upstream device 200 can be purposed to control the downstream device 300 or many devices.

The downstream device 300 can be a peripheral electronic device that is to be controlled by the upstream device 200. In the context of this application, the downstream device 300 is commonly an ancient device that uses an ancient communications protocol. For example, the downstream device 300 can be a motor controller for a hydroelectric dam, an embedded controller for a telescope, or a switching station on the electrical grid. In other examples, the downstream device 300 can be expensive, but ancient, off-the-shelf equipment that still has economic value such as a spectrum analyzer, signal generator, or oscilloscope.

In the example of FIG. 1, the upstream device 200 can be a modern computer while the downstream device 300 is an ancient device with which upstream device 200 cannot communicate because modern hardware of the upstream device 200 does not support the ancient communications protocol supported by the downstream device 300.

In one example, the communications protocol of the downstream device 300 can be X.224 which was a popular communications protocol between computers and peripheral devices in the late 1980s, 1990s, and in into the early part of the 2000s. Now, however, modern communications protocols (e.g. USB) have proliferated and displaced the X.224 protocol. The X.224 protocol was commonly implemented over ethernet but modern network cards do not support the unique aspects of the X.224 protocol. Thus, it is impossible to communicate with ancient devices, such as downstream device 300 operating on the X.224 protocol, with modern computing equipment such as upstream device 200, because the relative unavailability of hardware that is capable of sending X.224 protocol communications from modern hardware.

The protocol translator 100 can provide translation services between a modern protocol (e.g. USB) and an ancient protocol (e.g. X.224) so that the modern upstream device 200 (e.g. a PC) can seamlessly communicate with the ancient downstream device 300 (e.g. a telescope). The protocol translator 100 can receive communications from the upstream device according to a modern protocol such as USB. The protocol translator 100 can acknowledge and confirm the communications from the upstream device 200. The protocol translator 100 can reencode the communications according to the communications protocol (e.g. X.224) of the downstream device 300. The communications translator 100 can send the reencoded communications to the downstream device 300 and receive acknowledgements from the downstream device 300 according to the protocol of the downstream device 300.

The protocol translator can be symmetric in functionality, that is the procedure for receiving, confirming, reencoding, retransmitting, and acknowledging can be the substantially the same in communications sent from the upstream device 200 to the downstream device 300 and vice versa. For the purposes of this application, exemplary communications from the perspective of the upstream device 200 to the downstream device 300 are disclosed and described. Those of skill in the art, however, will appreciate that communications in the upstream direction, that is from the downstream device 300 back to the upstream device 200, are conducted in the same manner as the downstream communications and thus extensive detail of upstream communications has been omitted in the interest of brevity.

The protocol translator 100 can be an external hardware device such as a dongle that connects to a USB port of the upstream device 200 and has a specially programmed ethernet-style port for communicating with the downstream device 300. In another embodiment, the protocol translator is a special-designed network interface card that supports X.224 communication. In another embodiment, the protocol translator 100 is firmware that is flashed on an off-the-shelf network card to enable certain types of communications that are not supported by standard off-the-shelf network cards.

It is contemplated that portions of the protocol translator are implemented in software or firmware on either dedicated hardware or off-the-shelf hardware. The software can be embodied as computer code forming series of instructions that are saved on a computer readable medium that, when read and executed by a processor, perform the described aspects of the invention.

Figure 2:
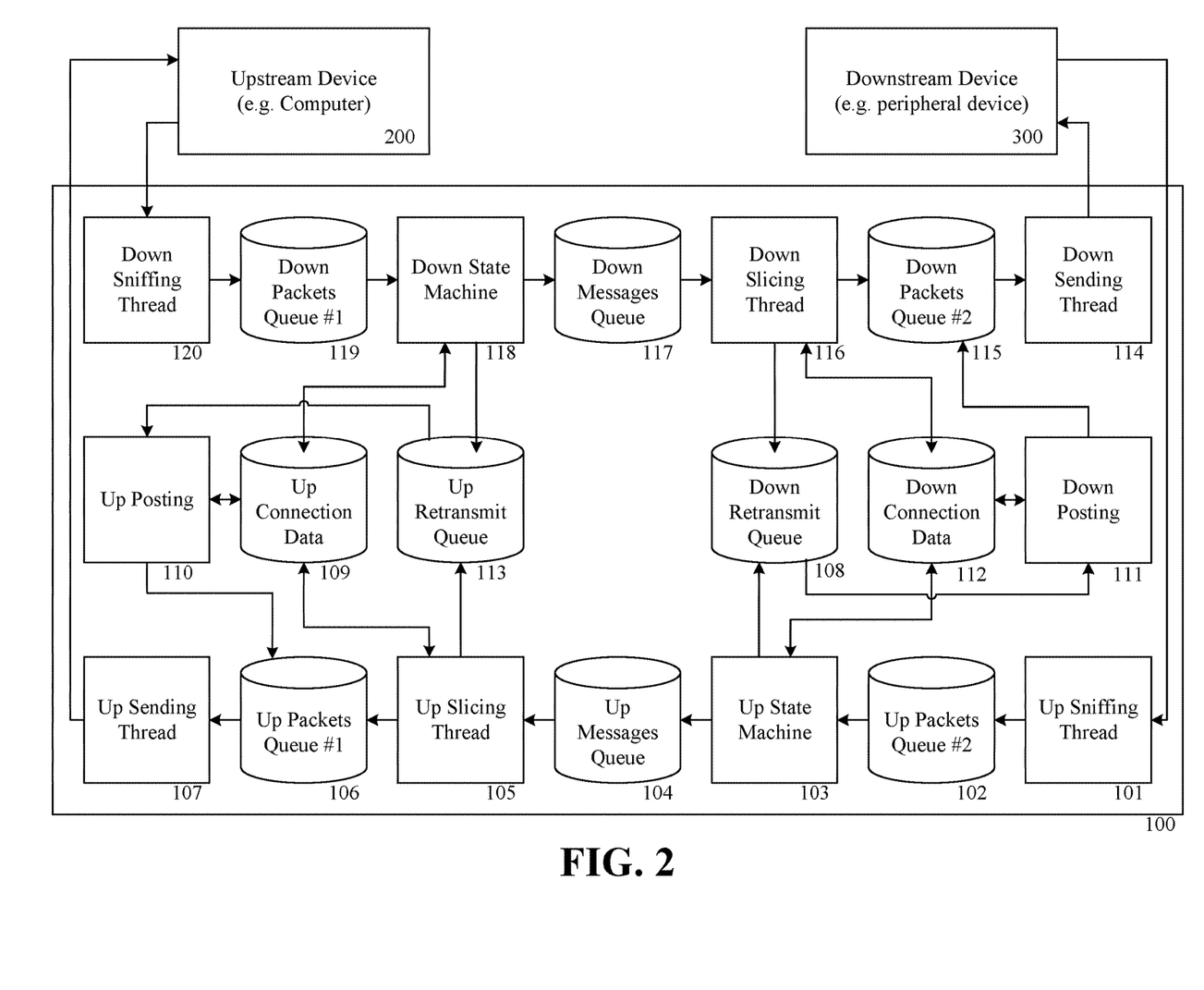
FIG. 2 is a system diagram of protocol translator according to an exemplary embodiment of the invention.

FIG. 2 is a system diagram of protocol translator according to an exemplary embodiment of the invention. As shown in FIG. 2, a protocol translator 100 can be an intermediary between an upstream device 200 and a downstream device 300. The upstream device 200 and downstream device 300 can utilize different communications protocols and thus need an intermediary to translate between them. For the purposes of this application, distinction is drawn between the term "message" and "packet." As used herein the term "message" can mean a complete communication. In an illustrative example, the sentence "I LOVE CARS" can be a message. As used herein the term "packet" can mean part of a message. A packet can be created by "slicing" a message according to a communications protocol. In an illustrative example, the message "I LOVE CARS" can be sliced into packets for each letter, e.g. "I", " ", "L", "O", etc. On the receiving and, a device can assemble the packets into the original message. Some messages may be sufficiently small such that they can be transmitted in a single packet. The packet commonly has header information such as time stamps, the number of packets to expect, a serial number of the packet, and a checksum and "slicing" further contemplates incorporating this header information into the packet. The data portion of a packet can be called a payload.

With respect to communications in the downstream direction, the protocol translator 100 includes a down sniffing thread 120, a down packets queue #1 119, a down state machine 118, a down messages queue 117, a down slicing thread 116, a down packets queue #2 115, and a down sending thread 114.

The down sniffing thread 120 can listen for packets from the upstream device 200. The down sniffing thread 120 can save packets received from the upstream device 200 in the down packets queue #1 119. The down state machine 118 can be the "brains" that decodes packets in the down packets queue 119 and unpacks and assembles the payloads into a message. The down state machine 118 can save complete messages in the down messages queue 117. The down slicing thread 116 can pull a message from the down messages queue 117 and encode or "slice" the message into new packets according to the protocol of the down stream device 300. The down slicing thread 116 can save packets destined for the downstream device 300 in the down packets queue #2 115. The down sending thread 114 can pull packets from the down packets queue #2 115 and send them to the downstream device 300.

Further with respect to communications in the downstream direction, the protocol translator 100 can include a down retransmit queue 108, a down connection data 112, and a down posting thread 111.

Upon slicing of a downstream message into packets by the down slicing thread 116, the down slicing thread 116 can simultaneously post packets to the down packets queue #2 115 and a copy of each packet to the down retransmit queue 108. The protocol translator 100 can receive acknowledgements from the downstream device 300. When an acknowledgement is received at the protocol translator 100 indicating that a particular packet or packets were received by the downstream device 300, those packets can be removed from the down retransmit queue 108. After a timeout period (e.g. 200 milliseconds) down posting thread 111 can cause unacknowledged packets to be reposted to the down packets queue #2 115 where they will be resent to the downstream device 300 by down slicing thread 114.

Down connection data 112 can maintain information related to communications with the downstream device 300. For example, the downstream device 300 can have communications parameters such as baud rate, an input buffer size, and a transmission window. In an illustrative example, the downstream device may only have sufficient memory to process 20 packets at a time. In this example, the downstream connection data 112 can maintain data to ensure that the protocol translator 100 does not overwhelm the downstream device 300 by sending too much data too fast. The down connection data 112 can further store information about the packets in the retransmit queue 108. The information can include for each packet in the retransmit queue 108, for example, the time the packet was first sent, the number of times it has been sent, and the time of the most recent retransmission. This information can be used to determine whether a time-out has occurred or, in other embodiments, where a retransmit threshold has been exceeded. For example, in some embodiments, an error condition can be indicated if a packet has been transmitted three times without acknowledgement.

With respect to communications in the upstream direction, a protocol translator 100 can include an up sniffing thread 101, up packets queue #2 102, and an up state machine 103. The up sniffing thread 101 can listen for and receive packets sent by the downstream device 300. The up sniffing thread 101 can post received packets to the up packets queue #2 102. The up state machine 103 can be the "brains" for processing upstream communications. The up state machine 103 can decode packets from the up packets queue #2 102 and store the payloads in a temporary cache.

When a "final" packet is received, the up state machine 103 can assemble the payloads into a message. A packet can be marked as final in the header data of the packet. A packet can be inferred to be final when it is the last packet in a known range supplied in header data. A packet can be inferred to be final when message include a predetermined number of packets. If the message is destined for the upstream device 200, the up state machine 103 can post the message to the up message queue 104 as will be described more particularly herein. If the message is an acknowledgement from the downstream device 300 the up state machine 103 can determine the packets (or range of packets) that were acknowledged and remove the acknowledged packets from the down retransmit queue 108 and associated data from the down connection data 112.

With respect to communications in the upstream direction, a protocol translator 100 can further include an up messages queue 104, an up slicing thread 105, and up packets queue #1 106, and an up sending thread 107. The aforementioned upstream components can function in the same way as the corresponding components in the downstream direction (although in the opposite direction). That is, up messages queue 104 can function like the down messages queue 117, up slicing thread 105 can function like down slicing thread 116, up packets queue #1 106 can function like down packets queue #2 115, and an up sending thread 107 can function like down sending thread 114. The components 104, 105, 106 and 107 can store, slice, queue, and send messages to the upstream device 200 according to the protocol for the upstream device 200.

Further with respect to communications in the upstream direction, a protocol translator can include an up retransmit queue 113, an up connection data store 109, and an up posting thread 110 that can function in much the same way as down retransmit queue 108, down connection data store 112, and down posting thread 111, respectively, albeit in the opposite direction. The up slicing thread 105 can "slice" messages from the up messages queue 104 into packets according to protocol for the upstream device 200. The packets can be stored in the up packets queue #1 106 and simultaneously stored in the up retransmit queue 113. Up sending thread 107 can pull packets from the up packets queue #1 106 and send them to the upstream device 200.

The upstream device 200 can reply to the protocol translator 100 with acknowledgement packets. The acknowledgement packets can be received by the down sniffing thread 120, and stored in the down packets queue #1 119. The down state machine 118 can pull packets from the down packets queue #1 119 and store the payloads in a temporary cache until a complete message is received. A complete message can be indicated by a packet marked as "final" or can be inferred when a certain number of packets have been received. When a complete message is received, the down state machine 118 can determine if the message is designated for the downstream device 200 or an acknowledgement packet for the protocol translator 100. If the message is for the downstream device 200, the message can be posted in the down messages queue 117 and the protocol translator can slice and send to the downstream device as described above. If the message is an acknowledgement message or other type of management message intended for the protocol translator 100, the down state machine can process the message accordingly. In the example of an acknowledgement message, the down state machine 118 can remove the packets identified in the acknowledgement message from the up retransmit queue 113.

The up posting thread 110 can monitor packets in the up retransmit queue 113 and corresponding data in the up connection datastore 109. If, for example, a packet exists in the up retransmit queue 113 and a predetermined timeout has been exceeded, the up posting thread 110 can repost that packet to the up packets queue #1 106 where it will be sent by up sending thread 107 to the upstream device 200. The up posting thread 110 can update information about the packet in the up connection data store 109 such as the number of times the packet has been sent and a time stamp for each sending attempt. If a packet has been sent more than a threshold number of times, an error condition can be indicated by the down state machine 118.

Figure 3:
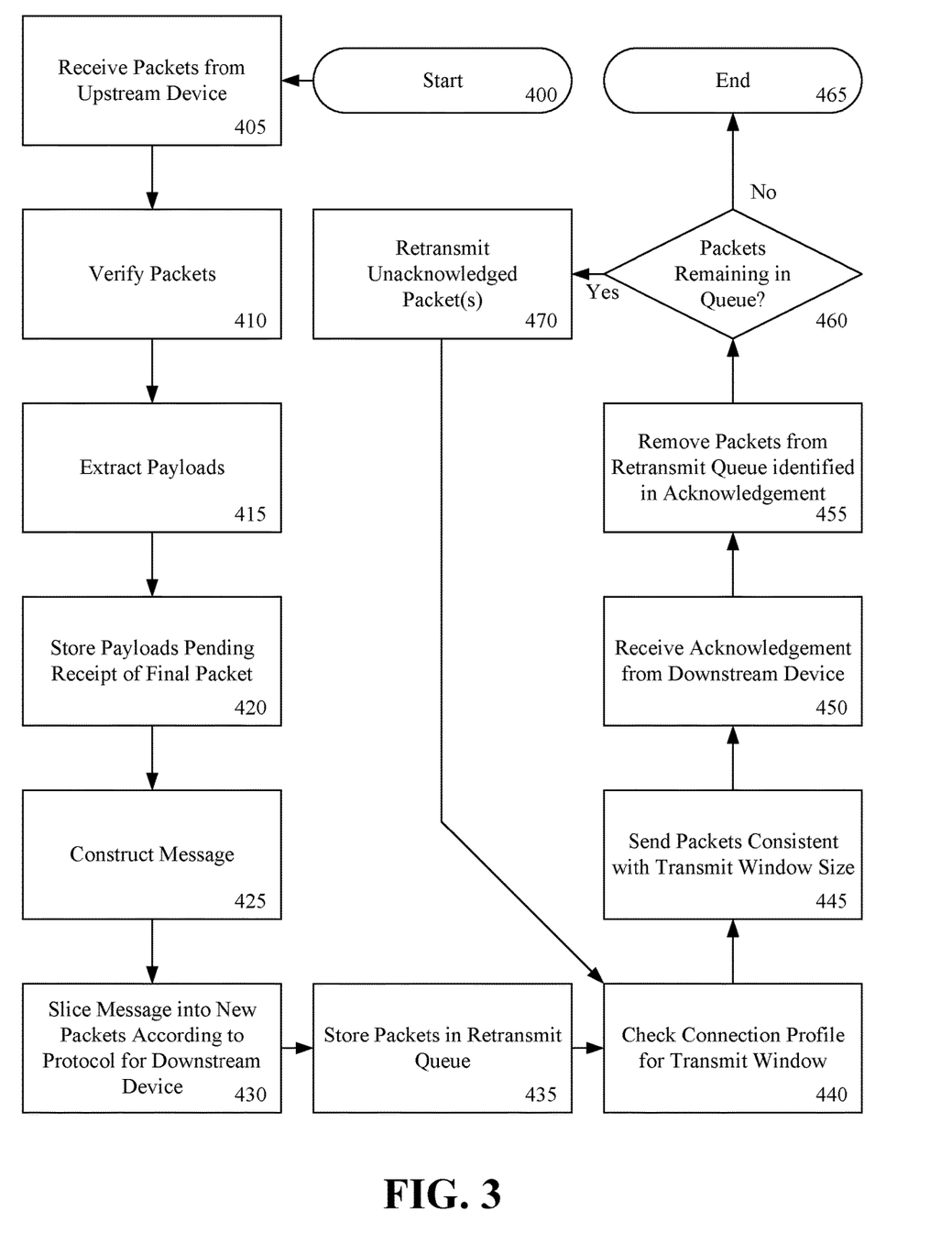
FIG. 3 is a flow chart of downstream communication according to an exemplary embodiment of the invention.

FIG. 3 is a flow chart of downstream communication according to an exemplary embodiment of the invention. FIG. 3 shows, generally, a process flow for the transmission of a single message, transmitted in packets, from an upstream device, through a protocol translator, to a downstream device. As shown in FIG. 3 downstream communication from an upstream device to a downstream device can start at 400. Packets can be received from the upstream device at 405. The packets can be verified in step 410. A payload can be extracted from each of the packets in step 415. The payloads can be stored in a temporary cache until a final packet is received in step 420. After a final packet is received, a message can be constructed from the payloads in the temporary cache 425. The message can be sliced into new packets according to a protocol for the downstream device in step 430. The packets can be stored in a retransmit queue 435. The protocol translator can check a connection profile for the downstream device and determine if a transmit window is open and packets can be sent to the downstream device in step 440. Packets can then be sent to the downstream device consistent with the size of the transmit window in step 445. An acknowledgement message can be received from the downstream device in step 450. Packets that are identified in the acknowledgement message can be removed from the retransmit queue in step 455. In decision step 460, if there are no packets remaining in the retransmit queue the process can end. Alternatively, in decision step 460, if there are packets remaining in the retransmit queue, the process can transition to step 470. In step 470, unacknowledged packets can be retransmitted to the down stream device and the process can transition back to step 440.

In a variation on the process flow of FIG. 3, after sending packets in step 445, it is possible that no acknowledgement message is received. This can occur when the downstream device has an error, is overloaded, or communications are otherwise unsuccessful. In this case, the protocol translator can optionally detect a timeout condition, and transition directly to step 460 and 470 where unacknowledged packets are retransmitted to the downstream device.

Figure 4:
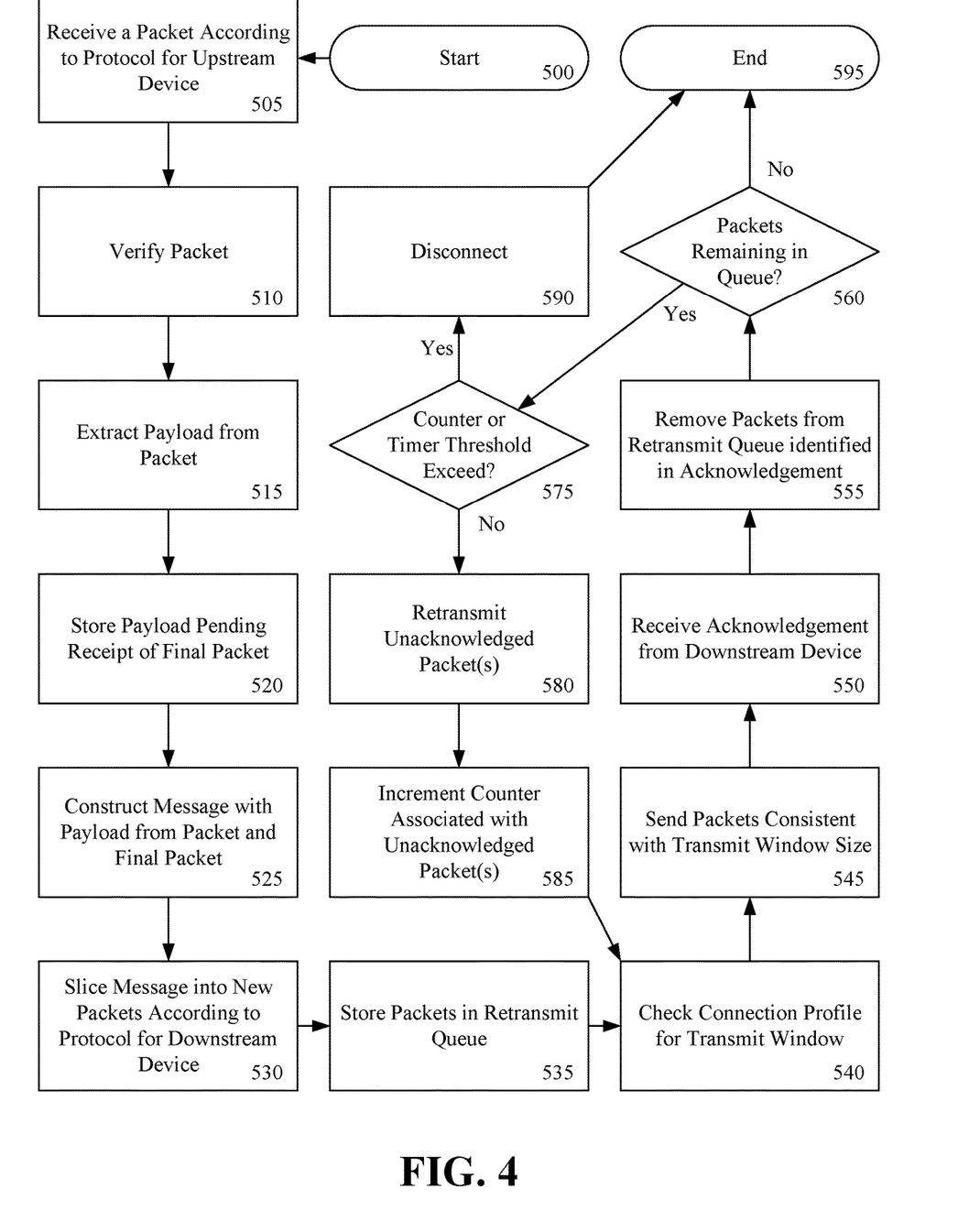
FIG. 4 is a flow chart of downstream communication according to an exemplary embodiment of the invention.

FIG. 4 is a flow chart of downstream communication according to an exemplary embodiment of the invention. FIG. 4 shows, generally, a process flow for the transmission of particular packets from an upstream device, through a protocol translator, to a downstream device. As shown in FIG. 4, the process can start in step 500. A packet can be received at the protocol translator in step 505. The packet can be encoded according to a protocol for the upstream device. The protocol translator can verify the packet in step 510, for example by evaluating its CRC or checksum. If the packet is successfully validated, the protocol translator can extract the payload from the packet in step 515. The payload may be a data portion of the packet. The packet may include other information such as header information. In step 520, the protocol translator can store the extracted payload from the packet until a "final" packet is received. After a final packet is received, the protocol translator can construct a message from the payloads of at least the packet and the final packet in step 525. In the interim other packets may have been received, and the payloads of those packets are optionally included in the message.

In step 530, the message formed from at least the packet and the final packet can be sliced into new packets according to the protocol for the downstream device. Depending on the protocol for the downstream device, the new packets might only be a single packet, the same number of packets as received by the protocol translator, or a different number of packets. In step 535, the new packets according to the second protocol can be stored in a retransmit queue. Simultaneously, the packets can be stored in a transmit queue for sending to the downstream device. In step 540, the protocol translator can check a connection profile associated with the downstream device for a transmit window. The connection profile can be maintained in the down connection data store discussed in conjunction with FIG. 2, element 112.

In step 545, the protocol translator can send packets to the downstream device consistent with the transmit window. In an example, the transmit window can have a maximum size of "20 packets." Each time a packet is sent, the transmit window is decremented and each time a packet is acknowledged the transmit window is incremented. Thus, when checking the transmit window, the protocol translator may determine the window is of size 12 which could indicate that 12 packets could be transmitted. If the number of packets to be sent is larger than the transmit window, excess packets can remain in a queue until additional space opens up in the transmit window.

In step 550 the downstream device can generate an acknowledgement that is received by the protocol translator. The acknowledgement can identify which packets that were received by the downstream device. In step 555, acknowledged packets can be removed from the retransmit queue. In step 560, the protocol translator can determine whether there are packets remaining in the retransmit queue. If there are no packets remaining, the process can end in step 595. If there are packets in the retransmit queue the process can transition to decision step 575.

In decision step 575, the protocol translator can determine whether a timeout event has occurred or a counter threshold has been exceeded with respect to a packet. The timeout and thresholds can be set according to preference. For example, if a packet has a counter of "3" that could indicate that the packet has been retransmitted three times, likely indicating an error condition, and the protocol translator can transition to disconnect step 590. In another example, a packet can have a timeout threshold of 200 milliseconds. In decision step 575, the protocol translator can determine whether the timeout threshold for the packet has been exceeded and transition to step 580 where the unacknowledged packet is retransmitted to the downstream device. In step 585, the protocol translator can increment the counter associated with the packet and the process can transition to step 540.

Figure 5:
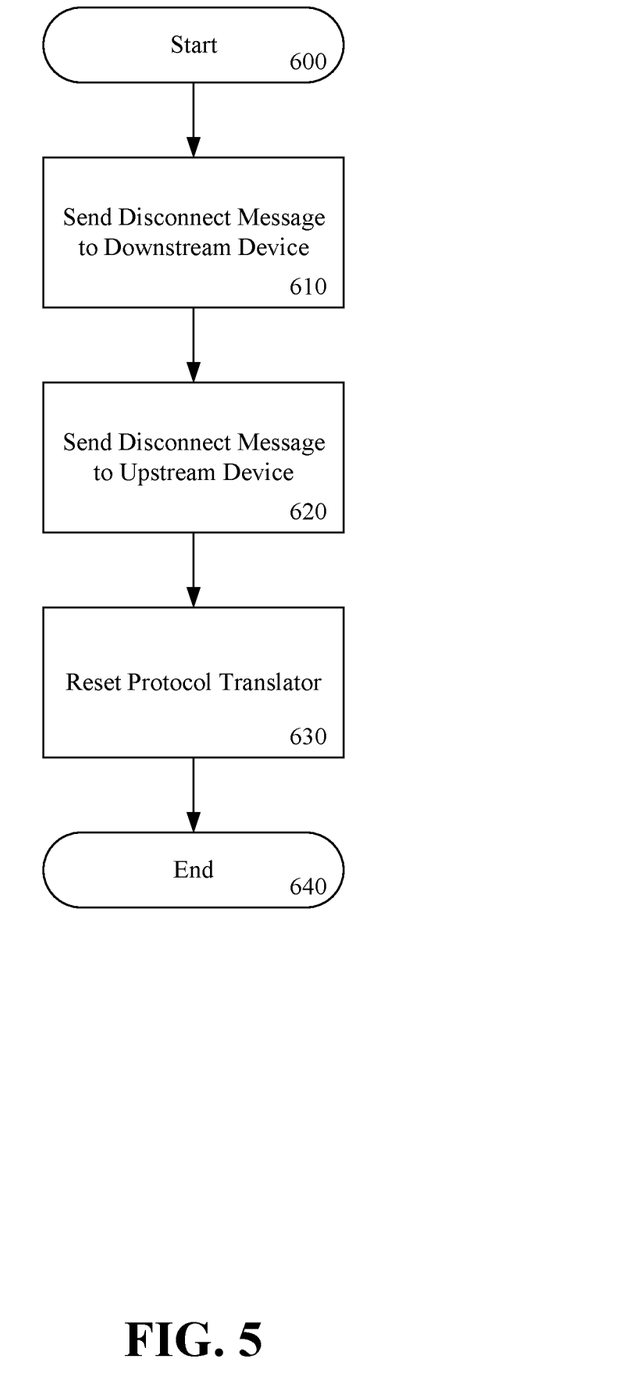
FIG. 5 is flow chart for a disconnection protocol according to an exemplary embodiment of the invention.

FIG. 5 is flow chart for a disconnection protocol according to an exemplary embodiment of the invention. It is contemplated that unrecoverable error may happen between the upstream device, the downstream device, and the protocol translator. This may happen for any number of reasons such as electrical failure, communications failure, or a mechanical failure. Thus it is contemplated that when the protocol translator detects an unrecoverable error (or simply is shut down) that the protocol translator "clean up" the connections and prepare to be reconnected.

As shown in FIG. 5 a disconnection protocol includes sending a disconnect message to the downstream device 610, sending a disconnect message to the upstream device 620, and resetting the protocol translator 630. Although FIG. 5 depicts a specific ordering, those of skill in the art will appreciate that steps 610 and 620 could be reversed in order and still achieve the objects of the invention.

In step 610 a disconnect message can be generated by the protocol translator and sent to the downstream device in accordance with steps 430-470 of FIG. 3. It should be appreciated that, in the example of a fatal error of the downstream device, the sending of the disconnect message to the downstream device in step 610 may fail. Thus, after a timeout of packets of a disconnect message the process can simply transition to the next step of FIG. 5.

In step 620 a disconnect message can be generated by the protocol translator and sent to the upstream device in accordance with steps 430-470 of FIG. 3. It should be appreciated that, in the example of a fatal error of the upstream device, the sending of the disconnect message to the upstream device in step 620 may fail. Thus, after a timeout of packets of a disconnect message the process can simply transition to the next step of FIG. 5.

In step 630 the protocol translator can be reset. Resetting of the protocol translator can include resetting the components of the protocol translator to an initial state and clearing stored data. Cleared stored data can be messages or packets stored in queues and upstream/downstream datastores for connection data such as the transmit window and packet information. Finally, the protocol translator can be set to a state where it is ready to receive a new connection.

Figure 6:
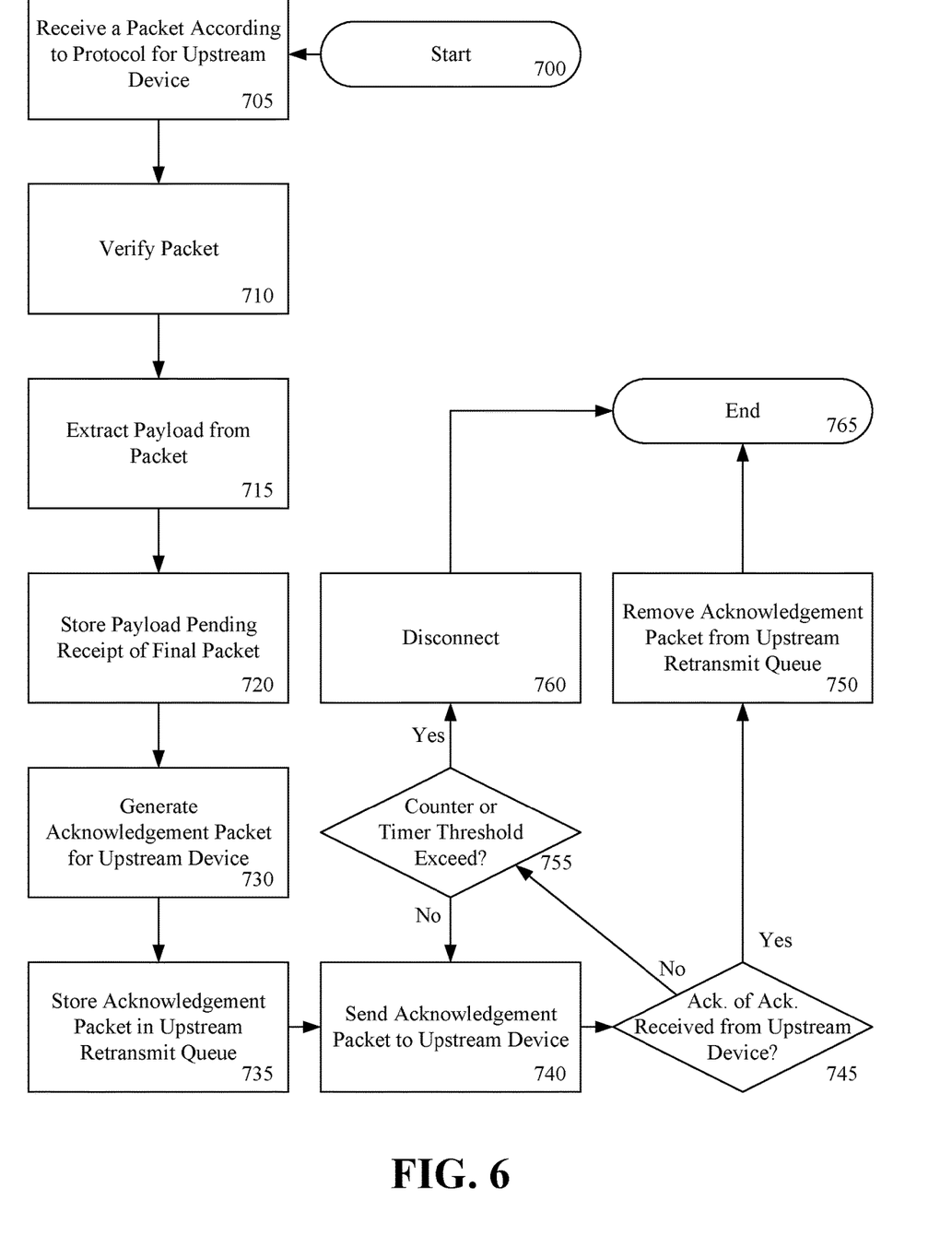
FIG. 6 is an acknowledgement protocol for packets according to an exemplary embodiment of the invention.

FIG. 6 is an acknowledgement protocol for packets according to an exemplary embodiment of the intention. The protocol of FIG. 6 can be implemented by a protocol translator to indicate to an upstream device that a packet from the upstream device was received by the protocol translator. As shown in FIG. 6, the acknowledgement protocol can begin in step 700. The steps 705, 710, 715, and 720 can be similar to steps 505, 510, 515, and 520 of FIG. 4. In step 705 a packet can be received at the protocol translator from an upstream device according to a communications protocol of the upstream device. The packet can includes a payload that is part of a message destined for a downstream device. In step 710 the protocol translator can verify the received packet, for example, by comparing the packet's header data to expected values or by checking a CRC/checksum. In step 715 a payload (e.g. a part of a message) can be extracted from the received packet. In step 720, the payload can be cached until a "final packet" is received. As described in conjunction with FIG. 4, these payloads can be used to generate a message that is then sliced and sent to the downstream device.

In step 730, the protocol translator can generate an acknowledgement according to the protocol of the upstream device and, in step 735, store that acknowledgement in an upstream retransmit queue. In step 740, the protocol translator can pull the acknowledgement from the upstream retransmit queue and send it to the upstream device. In step 745, the protocol translator can wait for the upstream device to acknowledge the acknowledgement. If the acknowledgement is acknowledged, the process can proceed to step 750 where the acknowledgement is removed from the retransmit queue. If the however, before an acknowledgement of the acknowledgement is received a timeout event occurs, the process can transition to step 755. Those of skill in the art will appreciate that the protocol translator need not acknowledge an acknowledgement of the acknowledgement, as this could create an endless loop of acknowledging.

In step 755 the protocol translator can determine how many times the acknowledgement has been sent by checking a saved counter. If the acknowledgement has been sent fewer than a threshold number of times (e.g. 3) the counter can be incremented and the process can transition to step 740 where the acknowledgement packet is retransmitted. If, alternatively the acknowledgement has been sent equal to or greater than a threshold number of times (e.g. 3), the protocol translator can indicate an error has occurred and transition to disconnect step 760. The disconnect step 760 can be performed in accordance with the protocol described in conjunction with FIG. 5. After disconnect step 760, the acknowledgement protocol can end.

The acknowledgement protocol of FIG. 6 is advantageous to indicate to both the upstream device and the protocol translator that a packet was received by the protocol translator and further, that the upstream device confirms to the protocol translator that it understands the packet was received by the protocol translator. Those of skill in the art will appreciate that the acknowledgement protocol of FIG. 6 for communications between an upstream device and the protocol translator is equally applicable to communications between a downstream device and the protocol translator.

It will be apparent to those skilled in the art that various modifications and variations can be made in the method of operating a protocol translator without departing from the spirit or scope of the invention. Thus, it is intended that embodiments of the invention cover the modifications and variations of this invention provided they come within the scope of the appended claims and their equivalents.

What is claimed is:

1. A method for operating a protocol translator between an upstream device and a downstream device, the method comprising:
   receiving, at the protocol translator from the upstream device, a first plurality of packets according to a first protocol;
   extracting a payload from each of the first plurality of packets according to the first protocol;
   constructing a message from the extracted payloads;
   slicing the message into a second plurality of packets according to a second protocol;
   storing the second plurality of packets in a retransmit queue; sending the second plurality of packets to the downstream device; receiving an a first acknowledgement from the downstream device; and removing from the retransmit queue, one or more packets identified by the first acknowledgement;
   generating a second acknowledgement indicating the first plurality of packets was received by the protocol translator;
   storing the second acknowledgement in an upstream retransmit queue;
   sending the second acknowledgement to the upstream device;
   receiving a third acknowledgement from the upstream device acknowledging the second acknowledgement; and
   upon receiving the third acknowledgement from the upstream device, removing the second acknowledgement from the upstream retransmit queue.

2. The method of claim 1 further comprising:
   leaving an unacknowledged packet in the retransmit queue; and
   retransmitting the unacknowledged packet to the downstream device.

3. The method of claim 1 further comprising:
   verifying the first plurality of packets conforms to the first protocol.

4. The method of claim 1 further comprising:
   filtering from the first plurality of packets a packet not addressed to the downstream device.

5. The method of claim 1 further comprising:
   maintaining, for the downstream device, a connection datastore, the connection datastore comprising an information whether the downstream device is ready to receive data and a maximum size of data that can be received.

6. The method of claim 1 further comprising:
   posting each of the first plurality of packets to a first downstream queue;
   caching each of the extracted payloads until a final packet is received; and
   wherein the message is constructed from the cached extracted payloads.

7. A method for operating a protocol translator between an upstream device and a downstream device, the method comprising:
   receiving, at the protocol translator from the upstream device, a first plurality of packets according to a first protocol;
   extracting a payload from each of the first plurality of packets according to the first protocol;
   constructing a message from the extracted payloads;
   verifying the message conforms to the first protocol;
   slicing the message into a second plurality of packets according to a second protocol;
   storing the second plurality of packets in a retransmit queue;
   maintaining, for the downstream device, a connection datastore, the connection profile comprising an information whether the downstream device is ready to receive data and a maximum size of data that can be received;
   sending the second plurality of packets to the downstream device consistent with the connection profile;
   receiving a first acknowledgement from the downstream device;
   removing from the retransmit queue, one or more packets identified by the first acknowledgement;
   leaving at least one unacknowledged packet in the retransmit queue;
   retransmitting the at least one unacknowledged packet to the downstream;
   generating a second acknowledgement indicating the first plurality of packets was received by the protocol translator;
   storing the second acknowledgement in an upstream retransmit queue;
   sending the second acknowledgement to the upstream device;
   receiving a third acknowledgement from the upstream device acknowledging the second acknowledgement; and
   upon receiving the third acknowledgement from the upstream device, removing the second acknowledgement from the upstream retransmit queue.

8. A method for operating a protocol translator between an upstream device and a downstream device, the method comprising:
   receiving, at the protocol translator from the upstream device, a first packet according to a first protocol;
   extracting a first payload from the first packet according to the first protocol;
   caching the first payload until a final packet is received;
   constructing a message from at least the first payload and the second payload of the final packet;
   slicing the message into a second plurality of packets according to a second protocol;
   storing a second packet of the second plurality of packets in a downstream retransmit queue;
   sending the second packet to the downstream device;
   receiving a first acknowledgement from the downstream device indicating the second packet was received by the downstream device;
   generating a second acknowledgement indicating the first packet was received by the protocol translator;
   storing the second acknowledgement in an upstream retransmit queue;
   sending the second acknowledgement to the upstream device
   receiving a third acknowledgement from the upstream device acknowledging the second acknowledgement; and removing the second acknowledgement from the upstream retransmit queue.

9. The method of claim 8 further comprising:

removing the second packet from the downstream retransmit queue.

10. The method of claim 8 further comprising:

resending the second packet from the downstream retransmit queue to the downstream device after a timeout event; and incrementing a counter associated with the second packet.

11. The method of claim 10 further comprising:

removing the second packet from the downstream retransmit queue when the counter exceeds a predetermined threshold value.

12. The method of claim 11 further comprising:

sending a first disconnect message to the downstream device according to the second protocol;

second a second disconnect message to the upstream device according to the first protocol; and resetting the protocol translator.

13. The method of claim 8 further comprising:

resending the second acknowledgement to the upstream device after a timeout event;

incrementing a counter associated with the second acknowledgement; and updating a timestamp associated with the second acknowledgement.

14. The method of claim 13 further comprising:

removing the second acknowledgement from the upstream retransmit queue when the counter exceeds a predetermined threshold value.

15. The method of claim 14 further comprising:

sending a first disconnect message to the downstream device according to the second protocol;

second a second disconnect message to the upstream device according to the first protocol; and resetting the protocol translator.

\* \* \* \* \*